Figure 3:
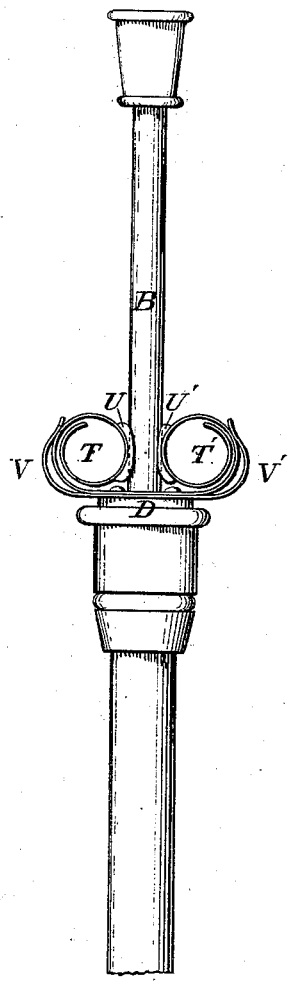

2 Sheets—Sheet 1.
J. McHENRY.
GAS-FIXTURES.
No. 178,177. Patented May 30, 1876.
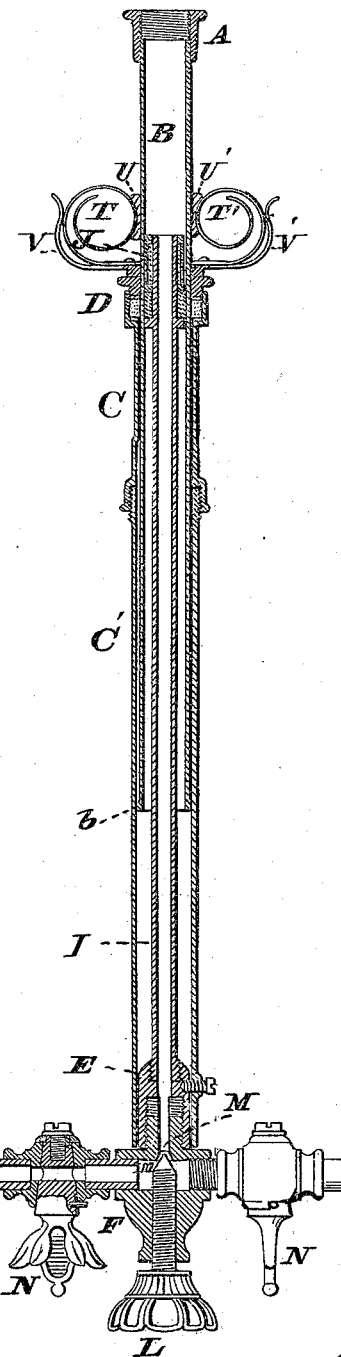
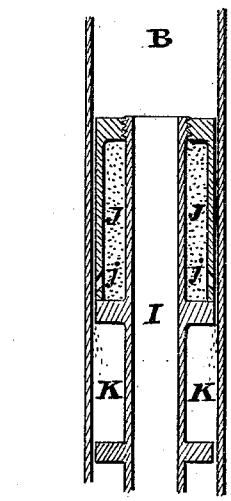
Attest
Geo. H. Knight
Horace E. Johnson.
John McHenry.

J. McHENRY.
GAS-FIXTURES.

No. 178,177.

2 Sheets—Sheet 2.

Patented May 30, 1876.

UNITED STATES PATENT OFFICE.

JOHN McHENRY, OF CINCINNATI, OHIO.

IMPROVEMENT IN GAS-FIXTURES.

Specification forming part of Letters Patent No. 178,177, dated May 30, 1876; application filed April 1, 1876.

*To all whom it may concern:*

Be it known that I, JOHN McHENRY, of Cincinnati, Hamilton county, Ohio, have invented a new and useful Gas-Fixture, of which the following is a specification:

My invention consists in sundry improvements in what are known as extension gasaliers or gas-pendants; and comprises a new and useful arrangement of triple concentric slides or sections, as and for the purposes hereinafter explained.

My invention further comprises a peculiar friction or brake mechanism, and the combination therewith of a stuffing-box, for the twofold purpose of preventing the accidental elongation of the fixture and of the escape of gas.

My invention further comprises a new and useful gas-regulating device.

My invention further comprises a new and useful joint for sliding or "telescope" fixtures, which operates without oil or grease.

In the accompanying drawings, Figure 1 is an axial section (with one brake in elevation) of a gas-fixture embodying my invention. Fig. 2 is an enlarged axial section, to exhibit more clearly my sliding joint. Fig. 3 is a side elevation, representing an automatic brake for use on a gas-pendant.

A represents a common nipple for attachment of the pipe B to the service-pipe. The pipe B has a customary swell or flange, $b$, around its lower end to prevent its being drawn entirely out of the encircling-tube C C′, which is surmounted by a stuffing-box, D, charged with plumbago and a friction-brake. The tube C is attached, by its lower end, to bushing E, which is screwed to the distributer F, having customary screw-threaded apertures in its sides for one or more branches, G, of burners H. Attached to and communicating with the bushing E is my innermost pipe I, which extends concentrically upward within the tube C C′ and pipe B to a height a little above the top of the said tube. Surrounding the upper part of the pipe I is a box or magazine, J, to hold powdered graphite or plumbago. This magazine has orifices $j$ near its bottom, to slowly let out the powder in sufficient quantities to keep the joint lubricated without oil or grease of any kind. Below the magazine J the pipe I is encircled by a chamber, K, which is filled with a packing of leather or other customary material. This joint prevents all contact or odor of gas upon the exposed surface of tube B. A conically-pointed screw, L, which occupies a screw-threaded aperture in bottom of distributer, occupies a corresponding conical seat, M, in the distributer, and, by being screwed down or up, operates to either close or open the main passage. This device enables the regulation of the volume or flow of gas to all the burners at once, and secures a proper flame without wastage or blowing, without special care or management of the stop-cocks N, which may therefore be put clear open whenever needed for use. The screw-valve L in the distributer can be adjusted to suit the various pressures of gas, according to the elevation at which the burners are placed, it being a well-known fact that the pressure of the gas is greater in proportion to the altitude of the burner above the source of supply, and, as a consequence, that, while the flame may be feeble or inadequate in the lower story or in the valley, it is excessive and liable to blow and waste on the hill-top or upper story. The device L remedies this defect by enabling the operator to increase or decrease the pressure for one or more burners without incurring the trouble of correcting irregularities by manipulation of the ordinary stop-cock N at every opening of the burner.

In order to prevent the accidental elongation of the fixture and to supersede the necessity of making the packing of the stuffing-box so tight as to render it difficult to lengthen or shorten the fixture, I combine with such box one or more brakes, which may have any suitable construction. My preferred form of brake is shown in Fig. 3. T T′ are two volute springs attached to the stuffing-box D and bearing two rubbers, U U′, whose opposing faces are hollowed to fit and grasp the pipe B. Braces V V′, also, fastened to the stuffing-box, press against the springs T T′, and, should the latter become ineffective, their efficiency can at any time be restored by bending toward each other the braces. Such combination of brake and stuffing-box may be used in conjunction with two tubes, as in Fig. 3, or with the compound arrangement of tubes illustrated in Fig. 1.

By the above-described arrangement of the stationary pipe B, connected by the compound joint D K with the pair of external and internal pipes C C' and I, permanently fastened at their delivery end, the smell of gas which accompanies the elongation of the ordinary extension-fixture is avoided. Should any gas escape past the joint K, it is effectually confined by the joint D. At the same time the external tube C C', constantly inclosing the slender interior tube I throughout its length, constitutes an effectual brace and stiffener, which makes it impossible to bend the pipe I, as often occurs in pushing up the common extension-fixture.

Should it be desired to lengthen or shorten the fixture, the construction of the brake is such as to yield easily to an upward push of the pendant and to offer a somewhat greater opposition to a downward pull of the same, so as to coact with the packing to hold the fixture to the position at which it has been set.

It will be seen that the stuffing-box D and the brake coact to produce the friction necessary to retain the sliding member securely at any elevation at which it may be placed. The said brake is preferably appended to and constitutes a part of a short section, C, of the outer sliding tube C C', so as to be conveniently furnished to the trade for attachment to any suitable fixture for which such a combined friction-joint and releasable brake may be required.

I claim as new and of my invention—

1. The described combination of stationary pipe B, connected by a compound joint, D K, with the pair of sliding pipes C I fastened at their delivery end to a common distributer, in the manner and for the object designated.

2. The plumbago-magazine J j, in combination with a suitable packing or stuffing box or chamber, K, below the same, substantially as and for the purpose set forth.

3. The gas body or distributer F, with seat M and screw-valve L, in connection with the stop-cocks N and burners H of one or more arms or branches, G, for the purpose set forth.

4. The automatic brake T T' U U' V V' attached to the stuffing-box D, as and for the purpose set forth.

In testimony of which invention I hereunto set my hand.

JOHN McHENRY.

Attest:
GEO. H. KNIGHT,
S. B. SPEAR.